United States Patent [19]

Zoerb

[11] Patent Number: 4,640,475

[45] Date of Patent: Feb. 3, 1987

[54] AIRCRAFT WHEEL BRAKE CONTROL SYSTEM AND METHOD

[75] Inventor: Melvin C. Zoerb, Renton, Wash.

[73] Assignee: The Boeing Company, Seattle, Wash.

[21] Appl. No.: 685,298

[22] Filed: Dec. 24, 1984

[51] Int. Cl.$^4$ .................. B60T 8/02; B64C 25/42
[52] U.S. Cl. .................. 244/111; 303/117; 303/119
[58] Field of Search ............... 244/111, 110; 303/117, 303/119, 113, 3, 15, 13, 14, 10-12, 92, 116, 5; 188/181, 358-359

[56] References Cited

U.S. PATENT DOCUMENTS

| | | | |
|---|---|---|---|
| 2,826,278 | 3/1958 | Highley | 244/111 X |
| 3,443,594 | 5/1969 | Frayer | 303/117 X |
| 3,671,082 | 6/1972 | Stevens | 303/117 X |
| 4,120,540 | 10/1978 | Devlieg | 303/117 |
| 4,125,234 | 11/1978 | Tregre | 244/111 |
| 4,130,322 | 12/1978 | Cook | 303/117 X |
| 4,360,239 | 11/1982 | Boehringer | 303/15 X |

Primary Examiner—Douglas C. Butler
Attorney, Agent, or Firm—Delbert J. Barnard

[57] ABSTRACT

A port control member (24) of a metering valve (10) is mechanically connected to a pilot operated foot pedal (38). Foot pedal (38) movement of this member (24) meters fluid pressure to a second electrically controlled metering valve (108, 110, 112). Pressure from the second metering valve (108, 110, 112) is delivered to one end of a port control member (126) of a third metering valve (126, 136, 138, 140). The third metering valve (126, 136, 138, 140) meters pressure and flow from a supply pressure to wheel brakes (50). Feedback pressure from the brakes (142) is applied to the port control member (126) in opposition to the command pressure (124). The command pressure (108, 110, 112) is fed back to act on the port control member (24) of the first stage valve (10) in opposite relation to the pilot developed pedal force.

31 Claims, 2 Drawing Figures

AIRCRAFT WHEEL BRAKE CONTROL SYSTEM AND METHOD

DESCRIPTION

1. Technical Field

This invention relates to the control of hydraulic brakes for aircraft wheels. More particularly, it relates to the provision of a three stage metering value system adopted to permit the pilot to control braking in a much more reliable and smooth fashion during landing and taxiing operations then is possible with current jet transport braking systems, and which is adapted to provide a reduced pressure to the brakes in a controlled fashion either during times when the antiskid system has failed or when the pilot might prefer a reduced output pressure such as during taxi braking.

2. Background Art

Many modern aircraft, including commercial jet transports manufactured by The Boeing Company of Seattle, Wash., use a simple single stage hydraulic valve to control brake pressure in proportion to the amount of foot pedal load or force applied to the valve by the pilot. In this type of system, the control force applied by the pilot to the brake pedal is transmitted to the valve through a mechanical cable/linkage system. The valve is connected to a hydraulic pressure source that it can meter flow to the brakes in a controlled fashion in proportion to the displacement of the valve. This type of valve typically contains a feedback chamber which is supplied with the metered pressure output of the valve, i.e. the pressure delivered to the brakes. By this means, the pilot applied force which displaces the port control member of the valve becomes balanced in a closed loop fashion by the metered pressure which is developed as a result of flow through the valve to the brakes. As the feedback pressure (which may also be termed the "brake metered pressure") increases, the valve is driven back to its no flow or null position, against the pilot applied force, to achieve a condition of equilibrium. To release the brake, the pilot simply relaxes the applied force. The brake pressure feedback force then moves the port control member of the valve back to its off position in which it communicates the brake line with return pressure.

A principal problem with this type of system is that a basic characteristic of aircraft brakes makes the initial application of braking quite difficult. This has been the source of numerous complaints by flight crews and is referred to by the general term of brake sensitivity. Brakes by their very nature must rotate as freely as possible when there is no brake pressure applied to them. This is necessary in order to minimize rolling drag resistance during takeoff and taxi operations which would otherwise reduce airplane takeoff performance and generate unnecessary brake heat. In order to minimize this drag, multi-rotor disk brakes are designed with considerable rotor-stator clearances. Springs are generally used to ensure that the brake pistons are retracted when there is no applied brake pressure. This affects the initial operation of the brakes since to develop brake torque the brake pistons must move or stroke through the clearance range until the rotors and stators are in firm contact, i.e. the brakes must be filled. At this point the brake torque increases rapidly in response to the brake pressure. During the clearance takeup stroke the pressure involved is very low and the fluid flow can be fairly high. This means that the brake metered pressure feedback force is proportionally low as sensed at the brake pedal through the feedback chamber of the brake metering valve. Once the contact point is reached the brake pressure rises rapidly, often generating considerably more brake torque than intended, resulting in a sudden jerky airplane response. While the brake pressure rise is a proportionally large feedback force to the brake pedal, it is generally too late to assist the pilot in making smooth brake application. This problem is often described as "nonlinear brake sensitivity". That is, as an attempt is made to apply the brakes, the pilot experiences a dead zone range with very little pedal feel force reaction which is followed by a sudden high brake force reaction which in turn gives a jerky airplane stopping response.

This problem with the existing brake control system is more acute for taxi braking situations since the required brake pressures are very low. For instance, most transport airplanes have 3,000 psi hydraulic systems but during taxiing, brake pressure in the range of 400 to 700 psi are sufficient to stop the airplane. Pressures much higher than these values produce excessive brake torques. The 400 to 700 psi brake pressure means that the effective pressure clamping the brake rotors and the stators is approximately 100 to 400 psi since it typically takes about 300 psi to start to compress the return springs. Pressures in this low range are especially difficult to control.

From the point of view of the pilot, if he applies a very light brake pedal force, the brake metering valve is just barely displaced and the flow to the brakes is very low which results in a very long time to fill the brakes to the point that a braking torque is developed. At times in trying to be cautious, he may not apply enough pedal force to overcome the pedal system friction and may not even displace the valve enough to meter fluid, in which case the lack of braking is finally realized and the pilot responds by applying more pedal force.

If the pilot applies too much pedal load from the start, the brake metering valve is opened considerably, resulting in a quite large flow rate to the brakes causing the brakes to fill quickly. This can result in the braking torque developing so rapidly that the airplane jerks abruptly before the pilot can reduce his brake pressure demand.

Often, to handle the brake sensitivity problem, a pilot will resort to a technique of applying a very light brake pedal load in an attempt to just barely close the brake clearance at all times while taxiing. In this manner, he will only need to increase the pedal force slightly to achieve taxi braking. This idea of riding the brakes is very abusive due to the excessive amount of heat that is generated.

The brake metering valve in the conventional system delivers pressure to the brake through an antiskid valve. If the resulting wheel speed response characteristics due to the braking action are satisfactory, as sensed by a wheel speed transducer and interpreted by an antiskid control untill, the antiskid valve does not reduce or alter the brake pressure in any way. If, however, the wheel speed response indicates that there is adverse skidding due to excessive brake pressure, then, the control unit will send a signal to the antiskid valve sufficient to reduce the brake pressure until proper wheel speed response is regained.

In the event of a failure of the antiskid system the pilot must be particularly careful since the only means in the conventional system for controlling the brake pressure is the brake metering valve which is connected to the full hydraulic system pressure source. In this antiskid off mode of operation, the pilot runs considerable risk of blowing tires if he applies to much brake force that he causes a wheel to lockup. On large aircraft it is very difficult to determine whether any of the several braked wheels are at or near the point of skidding in a braking condition with the antiskid system off or disabled.

DISCLOSURE OF THE INVENTION

The brake control system of the present invention is basically characterized by a three stage metering valve system. The first stage is connected to a foot pedal controlled by the pilot. The pilot's use of his foot pedal meters pressure through this valve to a second stage metering valve. The second stage metering valve includes electrical control means for modulating the pressure delivered to it by the first stage valve. The second stage valve is controlled by an electrical input signal supplied by the pilot. This valve has an open position in which it transmits the output pressure of the first stage valve directly to a command pressure chamber of the third stage metering valve without change. This command pressure is used for positioning a port control member of the third stage valve. The third stage valve meters flow and pressure from a supply pressure to the wheel brakes.

When the second stage valve is open, the metered pressure from the first stage valve is transmitted to the command pressure chamber of the third stage valve, and is used for moving the port control member of the third stage valve for metering pressure to the brakes. An electrical signal to the second stage metering valve causes a reduction in pressure between the second stage metering valve and the compound pressure chamber of the first stage metering valve.

The pressure in the command pressure chamber is fed back to the first stage metering valve and is used for exerting a force on the port control member of such valve in opposition to the pilot applied force, for moving such valve into a null position. The volume of the components between the output port of the first stage metering valve and the command pressure chamber of the third stage metering valve is relatively small and is always substantially full of fluid. Accordingly, very little flow is required through the first stage metering valve in order to produce a feedback pressure that can be felt by the pilot. This makes the system very responsive, both when the second stage metering device is open and inoperative and when it is in use for reducing pressure to the command pressure chamber.

In accordance with an aspect of the invention, the second stage metering valve is activated to benefit taxi braking and during times when the conventional antiskid control has either failed or is off. During a taxi braking operation the pilot is faced with the difficulty of trying to gently apply braking with a system that is necessarily designed by and for high energy situations associated with aborted take-offs. Instead of the full supply pressure required for critical braking situations (e.g. 3,000 psi), taxi braking only requires a small pressure (e.g. approximately 400 to 700 psi). The system of the present invention provides the capability to scale down the awkward large pressure by supplying a given value of control current and allows the same full range of brake pedal travel loads as used normally. For example, a control current could be selected so that while the pressure output of the first stage valve is controlled from zero to 3,000 psi, the pressure from the second stage metering valve varies from say, zero to 900 psi. This pressure reduction, in conjunction with the automatic brake pressure control of the third stage, can provide an extremely smooth taxi braking system.

If the antiskid control system has failed or is turned off, the pilot must be extremely careful not to blow tires during the landing. The system of the present invention has the ability by means of a pilot selected control current sent to the second stage metering valve to reduce the maximum brake pressure to a point where the possibility of blowing tires (due to locking up of the wheels) is either substantially reduced or eliminated. For instance, for an antiskid off dispatch operation of the airplane the control current might be set at a value that would keep the pressure that is delivered by the second stage metering valve to the command pressure chamber of the third stage metering valve somewhere between zero and 700 psi, while the presssure through the first stage metering valve is varied somewhere between zero and 3,000 psi. If the tire will not lockup and skid with 700 psi on the brake, then the landing can be made without concern of the damaging effects of a failed tire.

In accordance with the present invention, if the second stage metering valve is not activated, it does very little to alter the pressure output of the first stage metering valve, so that the command pressure chamber of the third stage metering valve will receive the output pressure of the first stage metering valve. In this mode of operation, there is the addition of a closed loop control of the third stage metering valve which provides the pilot with a means whereby he has automatic brake pressure control in direct response to his mechanical foot pedal control force. This occurs as the third stage metering valve develops a brake operating pressure in reponse to the output pressure of the first stage metering valve.

The brake control system and method of the present invention have the following advantages:

(1) Brake pressure levels are established automatically in direct response to the pedal force supplied by the pilot. The pilot does not need to anticipate the point where the brakes will fill in order to establish the intended brake pressure. This is performed automatically.

(2) Brake pedal feedback reactions are virtually instantaneous in response.

(3) Brake pressure levels are established more rapidly than with the conventional system having only a single stage metering valve, and without danger of the pressure overshooting the intended value. The delay that is typical for a conventional system when low brake pressures are applied is eliminated by the system of this invention.

(4) A means is provided whereby brake pressures are effectively scaled down to adjustable values (if desired) for the purpose of providing a reliable brake pressure control mode for either taxi braking conditions or airplane operations in which the antiskid control system is off.

BRIEF DESCRIPTION OF THE DRAWINGS

Like reference numerals are used to designate like parts throughout the views of the drawings, and.

BEST MODE FOR CARRYING OUT THE INVENTION

Figure 1:
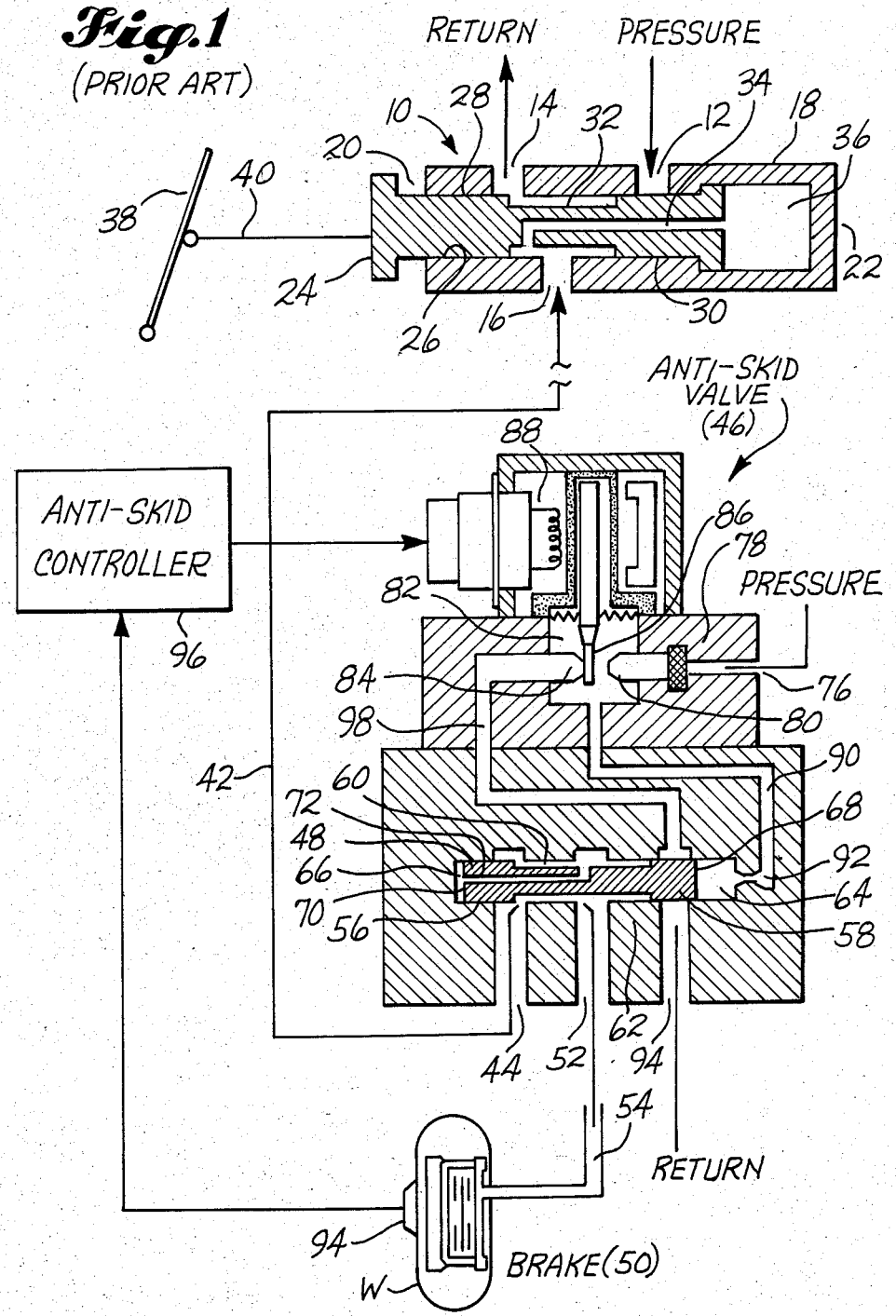
FIG. 1 is a schematic view of a conventional brake control system for an aircraft wheel brake, utilizing a single stage valve which meters both flow and pressure, shown connected in series with a known type of antiskid valve.

Referring to FIG. 1, the conventional system comprises a single stage metering valve 10 which includes a pressure port 12, a return port 14 and an output port 16. The ports are in a housing 18 which has an open end 20 and a closed end 22 and which defines an axial chamber 26. A valve port control member 24 is received within the axial chamber 26. Valve port control member 24 comprises a pair of axially spaced apart lands 28, 30 and an annular galley 32 positioned between the lands 28, 30. It also includes a feedback passageway 34 which connects the galley 32 with a feedback chamber 36 defined at the closed end of the housing 18.

A pilot operated foot pedal 38 is connected to an outer control end portion of the member 24, by a system of cables and mechanical linkages, or the like, designated 40 in FIG. 1.

FIG. 1 shows valve 10 in its fully off position. In this position the land 30 blocks pressure port 12 and the output port 16 is in communication with the return pressure via galley 32 and return port 14. The port control member 24 is in an extended position and the foot pedal 38 is "up".

In this system, when braking is desired, the pilot pushes down with his foot on the pedal 38, causing movement in the system of cables and linkage 40 which in turn causes the port control member 24 to be depressed in an amount proportional to pedal movement. As the port control member 24 moves inwardly, the land 28 progressively closes the return port 18 and movement of land 30 causes the pressure port to become progressively uncovered, and both flow and pressure are transmitted through the valve 10, via pressure port 12, galley 32 and output port 16, in proportion to displacement of the control member 24.

In this system a conduit 42 connects the output port 16 to an input port 44 of an antiskid valve 46. Under normal conditions, the port control member 48 of antiskid valve 46 is positioned to allow unmodulated feed of pressure and flow through the antiskid valve 46 to the piston of the brake 50. In FIG. 1, the brake port 52 of antiskid valve 46 is shown connected to a conduit 54 which leads to the brake pistons.

The port control member 48 includes first and second axially spaced apart lands 56, 58, and an annular galley 62 positioned between them. A command pressure chamber 64 is defined at a first end of the port control member 48 and a feedback chamber 66 is defined at the opposite end. A command pressure in chamber 64 acts on surface 68 to urge port control member 48 towards a fully open position and the feedback pressure in chamber 66 acts on a surface 70 and tends to urge the port control member 48 in an opposite or flow and pressure reducing direction. A feedback passageway 72 communicates the galley 62 with the feedback chamber 66.

When the galley 62 is in communication with the return port 74, the feedback chamber 66 is at return pressure. When the galley 62 is in communication with the brake port 52, the feedback chamber 66 receives the brake pressure.

The conventional antiskid valve 46 that is illustrated includes a supply pressure port 76 which delivers fluid through a filter 78 to a first nozzle 80. Nozzle 80 is positioned to discharge into a chamber 82. A second nozzle 84 is positioned opposite nozzle 80. A flapper 86 is positioned between the nozzles 80, 84 and is moved back and forth by a torque motor 88. When the flapper 86 is in the position illustrated, the orifice of nozzle 84 is closed and the pressure delivered into chamber 82 is transmitted via a passageway 90, which includes a flow control orifice 92, into the command pressure chamber 64. The aircraft wheel W includes a transducer 94 which measures wheel speed. If transducer 94 indicates that the wheel is not skidding, the antiskid valve 46 will not modulate the flow and pressure to the brake piston. The signal from transducer 94 is received by a controller 96. If this signal indicates that the brake force is too large, the controller 96 sends a signal to the torque motor 88, causing it to swing the flapper 86 away from nozzle 84 and towards nozzle 80. This results in the orifice in nozzle 84 being uncovered and being connected via passageway 98 to return port 74. The pressure within chamber 82 is reduced and this means that the command pressure delivered via passageway 90 to command pressure chamber 64 is also reduced. As the pressure in chamber 64 is reduced, a pressure differential is created which tends to shift the port control member 48 to the right (as pictured). This movement of member 48 causes the land 56 to close an additional portion of the input port 44, decreasing flow and pressure through path 44, 60, 52, 54 to the brake piston.

Antiskid valves of this general configuration are manufactured by a number of companies for a variety of applications in industry and especially in aerospace. Typical suppliers include: Hydraulics Research, Los Angeles, Calif.; Goodyear Aerospace, Akron, Ohio.; Dunlop, England; and Bendix, Los Angeles Calif. The particular valve that is illustrated is a valve marketed by the Hydro Aire Division of the Crane Company, of Burbank, Calif., and has a Hydro Aire Part Number of 37-231.

The antiskid valve shown by FIG. 1 has been described in considerable detail, because the system of the present invention includes a second valve of this type which is located between the pedal controlled valve and the regular functioning antiskid valve 46, in a different hookup, to produce a new function.

It is to be understood that the use of a second valve assembly identical to the valve assembly which performs the antiskid function is merely one way (a convenient way) of obtaining hardware capable of being combined with a conventional single stage metering valve 10 to provide the three stage metering valve which characterizes the control system of the present invention. As should be apparent, a person skilled in the art could take the information set forth below and use it to construct a number of hardware embodiments, differing from the hardware that is disclosed but capable of performing the same function. It is also to be understood that the various units, assemblies and subassemblies utilized in the system can be divided and combined component-wise in a number of different ways. Each may include its own housing, or several or all of the components may be included in a single housing.

Figure 2:
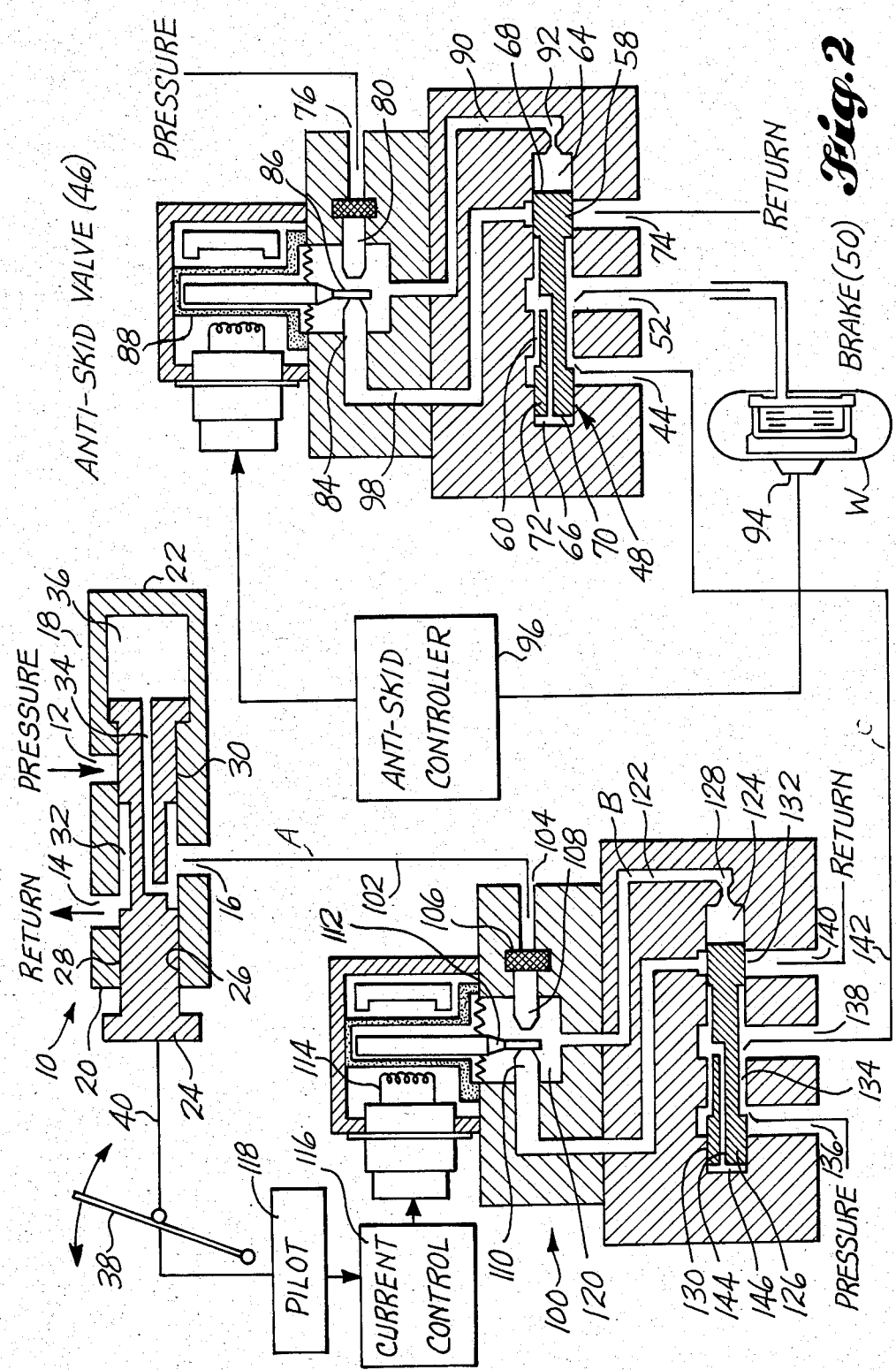
FIG. 2 is a schematic diagram of an embodiment of the brake control system of the present invention, showing the output of a foot pedal controlled first stage metering valve connected to deliver a pressure to a second stage metering valve which in turn is connected to deliver a command pressure to a third valve, and showing the third stage valve in series with a source of supply pressure, a conventional antiskid valve and an aircraft wheel brake.

Referring now to FIG. 2, the conventional single stage valve 10 is connected to a conventional antiskid valve 100 in a novel way, to produce what is in effect a three stage metering valve. In the system of the invention, the three stage metering valve replaces the old single stage valve in series between the brake pedal 38 and the antiskid valve 46.

Even though valve 100 of the illustrated embodiment is identical to the above-described antiskid valve 46, because it is plumbed into the system in a different way, to perform a different function, the valve 100 will be redescribed, using new reference numerals for each of its parts, so that these reference numerals can be used in a description of the new function formed by this admittedly old hardware.

A conduit 102 connects the output port 16 of valve 10 with inlet port 104 of valve 100. Fluid delivered via passageway 102 and port 104 flows through a filter 106 to a first nozzle 108. A second nozzle 110 is spaced opposite nozzle 108, and a flapper 112 is positioned between the two end orifices of the two nozzles 108, 110. Flapper 112 is positioned back and forth between the two orifices by a torque motor 114 which receives a command signal from a current control device 116 which receives its input from the pilot 118. By this structure, the pressure reduction is substantially linear and is proportional to an electrical command signal. Nozzle 108 discharges into a chamber 120. A passageway 122 communicates chamber 120 with a command pressure chamber 124 at one end of a valve port control member 126. A flow control restriction or orifice 128 is located in passageway 122.

Valve port control member 126 includes axially spaced apart lands 130, 132, separated by an annular galley 134. Port control member 126 controls fluid flow and pressure transmission between a pressure port 136 and an output port 138 and a return port 140. In accordance with an aspect of the invention, the output port 138 is connected via a conduit 142 to the input port 44 of the antiskid valve 46. Valve port control member 126 includes a feedback passageway 144 which connects the galley 134 with a feedback chamber 146 defined in the valve housing at the end of member 126 opposite the command pressure chamber 124.

The portion of valve 100 which includes the flapper 112 is herein referred to as the second stage metering valve. The valve unit 10 functions as a first stage metering valve and will hereinafter be referred to as the first stage metering valve 10. The portion of valve 100 which includes valve port control member 126 will be referred to as the third stage metering valve.

In the conventional system, the output port 16 of the valve 10 would be connected to the port which is designated 44 in FIG. 2 (see FIG. 1). In the system of this invention, the output port 16 of the first stage valve 10 is connected to the input port to nozzle 108. The input or pressure port 136 is connected to a source of supply pressure. As already mentioned, the output port 138 of valve 100 is connected via a conduit 242 to the inlet port 44 of the antiskid valve 46. Return port 140 is connected to return pressure.

The functioning of the system of the present invention is as follows:

When the pilot 118 applies a force to the first stage metering valve 10 through his foot pedal 38, the port control member 24 is moved to develop a pressure in path 16, 102, 104 which is in direct proportion to the applied force at the pedal 38. The volume of fluid between port 16 and nozzle 108 is very small. As a result, the response of pressure between port 16 and nozzle 108 is very rapid relative to the applied force. This means that the feedback pressure load to the pedal 38 also responds rapidly. The second stage valve 108, 110, 112 receives the pressure from port 16 and either transmits it on unchanged or reduces it in proportion to the control current from 116, to produce the command pressure in chamber 124. Again, the volume between chamber 120 and chamber 124 is very small and the response is therefore extremely rapid.

The third stage of the metering valve receives the command pressure in chamber 124 and uses it to develop the pressure that is delivered by the third stage, via conduit 142, to the antiskid valve 46. The volume of fluid between port 138 and the brake piston is considerable since it consists of the hydraulic conduits leading to the brake and the brake volume itself. Due to the capacity of the third stage, however, and its automatic pressure and flow control characteristics, the third stage is capable of filling the brakes and establishing a steady brake pressure much more quickly then is possible with the conventional system (FIG. 1) where a simple brake metering valve 10 is used alone.

As shown by FIG. 2, the pilot has direct control of the first stage through his brake pedal system 38, 40, 24. FIG. 2 also shows that the pilot can activate the second stage by means of the control current source 118. The third stage provides the desired output power in a controlled fashion to establish the desired level of braking.

Operation of the system of the present invention would probably fall into two categories in practical transport airplane applications, accomplished by switching associated with the control current.

During normal takeoffs and landings with a properly functioning antiskid system, the control current would be set to zero or switched off. This could also be the case for taxi braking since the third stage of the invention provides much improved braking characteristics on its own compared to existing systems. For antiskid system failure modes the complete three state assembly would be active to reduce the output brake pressures consistant with antiskid failure performance requirements. In certain cases this type of control mode could also improve taxi braking characteristics beyond that mentioned above.

The following provides details of the two operational categories:

When the second stage is activated by means of a control current signal this stage is able to reduce or scale down pressure B (between chamber 120 and chamber 124) in a proportional manner relative to pressure A (between port 16 and nozzle 108). Pressure C (from port 138) which is sent to the brakes responds directly to pressure B by the action of the third stage, providing automatic control of the intended brake pressure. A reduction or ratio between pressure B and pressure A can be adjusted by varying the amount of valve control current, by use of the current control 116.

The value of this mode of operation of the variable gain three stage brake metering valve system is specifically significant for two situations of airplane braking control. These are (1) taxi braking and (2) antiskid system failed/off dispatches.

During taxi braking operations the pilot is faced with the difficulty of trying to gently apply braking with a system that is necessarily designed by and for high energy situations associated with aborted takeoffs. Instead of the full supply pressure (e.g. 3,000 psi) required for critical braking situations, taxi braking requires a much smaller pressure (e.g. approximately 400 to 700 psi). This invention provides the capability to scale down the output pressure (pressure B relative to pressure A) by supplying a given value of control current and allows the same full range of brake pedal travel and loads as used normally. For instance, the control current could be selected so that when pressure A was controlled from zero to 3,000 psi, pressure B would vary from zero to 900 psi. This pressure reduction, in conjunction with the automatic brake pressure control of the third stage, can provide an exceptionally smooth taxi braking system.

If the antiskid system fails, or is turned off, the pilot must be extremely careful not to blow tires during landing. The brake control system of the present invention has the ability by means of the control current sent to the second stage to reduce the maximum brake pressure to the point where the possibility of blowing tires (due to locking up the wheels) is either substantially reduced or eliminated. For instance, for an antiskid off dispatch operation of the airplane the control current might be set at a value that would keep pressure B between zero and 700 psi when pressure A varies from zero to 3,000 psi. If the tire will not lockup and skid with 700 psi on the brake, then the landing can be made without concern for the damaging effects of a failed tire.

When the second stage of the invention is not activated, it does very little to alter the pressure sent out by the brake metering valve so that pressure A and pressure B are essentially equal. In this mode of operation, the addition of the cloed loop control of the third stage (addition to the single stage metering valve of a conventional system) provides the pilot with a means whereby he has automatic brake pressure control in direct response to his mechanical foot pedal control force. This occurs as the third stage develops pressure C in response to pressure B (where B equals A) sent by the first stage. The second stage is inactive during this mode of operation the hydraulic fluid simply passes through this stage.

In summary, the system of the present invention has the following advantages:

(1) Brake pressure levels are established automatically in direct response to the pedal force applied by the pilot. The pilot does not need to anticipate the point where the brakes will fill in order to establish the intended brake pressure. This is performed automatically.

(2) Brake pedal feedback reactions are virtually instantaneous in response.

(3) Brake pressure levels are established more rapidly than with the conventional system having only a single stage metering valve, and without danger of the pressure overshooting the intended value. The delay that is typical for a conventional system when low brake pressures are applied is eliminated by the system of this invention.

(4) A means is provided whereby brake pressures are effectively scaled down to adjustable values (if desired) for the purpose of providing a reliable brake pressure control mode for either taxi braking conditions or airplane operations in which the antiskid system is off.

In the drawing only a single wheel W is illustrated for the sake of simplicity. In actual practice the system of the invention would be connected to control a plurality of wheel brakes W.

It is to be understood that the system that has been illustrated and described is merely one embodiment of the invention. The details of construction of the various valves and other components of the system can be changed without departing from the invention as defined by the claims. It is the claims, interpreted in accordance with the established rules of patent claim interpretation, including the doctrine of equivalents, that is to determine the scope and content of the invention.

What is claimed is:

1. An aircraft wheel brake controlling system, comprising:

a first stage metering valve including a first port control member, a pressure port, a return port and an output port;

pilot operated foot control means for moving the first port control member in a pressure port opening first direction;

a second stage metering valve having an inlet port, an outlet port and pressure control means between such ports;

first conduit means connecting the output port of the first stage metering valve to the input port of the second stage metering valve;

a third stage metering valve comprising a second port control member, a pressure port, a return port, a brake port and a command pressure chamber at one end of the second port control member;

second conduit means connecting the output port of the second stage metering valve to the command pressure chamber of the third stage metering valve;

third conduit means connecting the pressure port of the third stage metering valve to the source of supply pressure;

fourth conduit means connecting the return port of the third stage metering valve to return pressure;

fifth conduit means connecting the brake port of the third stage metering valve to an aircraft wheel brake;

wherein the first stage metering valve has an off position in which there is no foot pedal force on the first port control member and such first port control member is positioned to block the pressure port and to communicate the outlet port with the return port;

wherein a pilot foot force supplied to the foot control means depresses the first port control member so that it in turn meters flow from the pressure port to the output port in proportion to displacement of the first port control member;

wherein said third stage metering valve has an off position in which the second port control member is positioned to block the pressure port and communicate the brake port with the return port;

wherein a pilot applied foot force on the foot control means, for causing the first port control member to meter pressure through the first stage metering valve, results in the delivery of a command pressure to the command pressure chamber of the third stage metering valve, via the second stage metering valve, and this causes the second port control member to move and meter pressure and flow through such third stage metering valve in an amount proportional to the displacement of the second port control member;

wherein said third stage metering valve includes feedback means for feeding brake pressure in the fifth conduit means to the second port control member, to exert a force on such second port control member opposite to the command pressure force, for moving the second port control member into a null position in response to the pressure build-up in the brake; and said first stage metering valve including feedback means for delivering a feedback pressure signal from the first conduit means to the first port control member, for exerting a force on such first port control member opposite to the pilot applied foot force, for moving the first port control member to a null position in response to a pressure increase in said first conduit means.

2. An aircraft wheel brake controlling system according to claim 1, wherein the pressure control means of the second stage metering valve includes an electrical control which receives a control signal from the pilot, and said second stage metering valve has an off position in which it essentially makes no change in the pressure delivered to it by the first stage metering valve so that the second stage metering valve in effect transmits the pressure output of the first stage metering valve to the command pressure chamber of the third stage metering valve.

3. An aircraft wheel brake controlling system according to claim 2, wherein the electrical control means for the second stage metering valve is operable by the pilot for reducing the pressure received from the first stage metering valve and transmitting such reduced pressure to the command pressure chamber of the third stage metering valve.

4. An aircraft wheel brake controlling system according to claim 3, wherein the volumes of the first conduit means the second stage metering valve, the second stage conduit means and the command pressure chamber of the third stage metering valve are collectively small and require very little flow through the first stage metering valve in order to produce a feedback pressure to the first stage metering valve.

5. An aircraft wheel brake controlling system according to claim 4, further including an antiskid valve in the fifth conduit means.

6. An aircraft wheel brake controlling system according to claim 4, further including an antiskid valve in the seventh conduit means.

7. An aircraft wheel brake controlling system according to claim 3, further including an antiskid valve in the fifth conduit means.

8. An aircraft wheel brake controlling system according to claim 2, wherein the volumes of the first conduit means, the second stage metering valve, the second stage conduit means and the command pressure chamber of the third stage metering valve are collectively small and require very little flow through the first stage metering valve in order to produce a feedback pressure to the first stage metering valve.

9. An aircraft wheel brake controlling system according to claim 8, further including an antiskid valve in the fifth conduit means.

10. An aircraft wheel brake controlling system according to claim 2, further including an antiskid valve in the fifth conduit means.

11. An aircraft wheel brake controlling system according to claim 1, wherein the volumes of the first conduit means, the second stage metering valve, the second stage conduit means and the command pressure chamber of the third stage metering valve are collectively small and require very little flow through the first stage metering valve in order to produce a feedback pressure to the first stage metering valve.

12. An aircraft wheel brake controlling system according to claim 11, further including an antiskid valve in the fifth conduit means.

13. An aircraft wheel brake controlling system according to claim 1, further including an antiskid valve in the fifth conduit means.

14. An aircraft wheel brake controlling system according to claim 1, wherein the second stage metering valve comprises a fluid chamber and the inlet port for such metering valve is in the form of a calibrated orifice at the end of an inlet tube leading into said chamber, and wherein the outlet port leads out from said chamber, and wherein said second metering valve also comprises a pressure venting tube in axial alignment with the inlet tube, and said second stage metering valve includes passageway means leading from said tube pressure venting to return pressure, and the means for metering pressure includes a mechanical element for controlling the amount of flow out from the fluid chamber through said pressure venting tube.

15. In an aircraft wheel brake controlling system:
an aircraft wheel brake including fluid operated brake applying means;
a first stage metering valve comprising:
housing means defining a first axial chamber having a closed end, an end opening, a pressure port, a return port and an output port,
a first port control member within said chamber, including a control portion which projects outwardly from said chamber through said end opening,
said first port control member being movable axially within said chamber between an extended position and a depressed position,
said first port control member functioning to block the pressure port and connecting the output port when the first port control member is extended,
said first port control member functioning to block the return port and connecting the pressure port to the output port when the first port control member is depressed, and
said first port control member functioning to meter flow from the pressure port to the output port in proportion to displacement of the first port control member between its extended and depressed positions;
pilot operable control means in contact with the control portion of said first port control member, for depressing the first port control member by foot pressure;
a second stage metering valve comprising an inlet port, an outlet port, and electrically controlled means between the two ports for reducing the pressure of the fluid between the inlet and outlet ports at a rate proportional to a control current input;
a third stage metering valve comprising:
housing means defining a second axial chamber having first and second closed ends, a pressure port, a return port and a brake port;
a second port control member in said second axial chamber, movable axially within said second axial chamber between first and second positions:

said second port control member functioning to block the pressure port and connecting the brake port to the return port when the second port control member is in its first position, said second port control member functioning to block the return port and connecting the pressure port to the brake port when the said second port control member is in its second position, and said second port control member functioning to meter flow from the pressure port to the brake port in proportion to displacement of the second port control member between its first and second positions;

first conduit means connecting the pressure port of the first stage metering valve to a supply pressure;

second conduit means connecting the return port of the first stage metering valve to return pressure;

third conduit means connecting the output port of the first stage metering valve to the inlet port of the second stage metering valve;

fourth conduit means connecting the outlet port of the second stage metering valve to the first end of the second axial chamber located in the third stage metering valve;

fifth conduit means connecting the pressure port of the third stage metering valve to a source of supply pressure;

sixth conduit means connecting the return port of the third stage metering valve to return pressure; and seventh conduit means connecting the brake port of the third stage metering valve to the fluid operated brake applying means of the aircraft wheel brake.

16. An aircraft wheel brake controlling system according to claim 15, wherein the electrically controlled means of the second stage metering valve includes means for receiving a control current input signal from the pilot, and controlling pressure in response to said signal and wherein said second stage metering valve has an off position in which it essentially makes no change in the pressure delivered to it by the first stage metering valve so that the second stage metering valve in effect transmits the pressure output of the first stage metering valve to the command pressure chamber of the third stage metering valve.

17. An aircraft wheel brake controlling system according to claim 16, wherein the electrical control means for the second stage metering valve is operable by the pilot for reducing the pressure received from the first stage metering valve and transmitting such reduced pressure to the command pressure chamber of the third stage metering valve.

18. An aircraft wheel brake controlling system according to claim 17, wherein the volumes of the first conduit means the second stage metering valve, the second stage conduit means and the command pressure chamber of the third stage metering valve are collectively small and require very little flow through the first stage metering valve in order to produce a feedback pressure to the first stage metering valve.

19. An aircraft wheel brake controlling system according to claim 17, further including an antiskid valve in the seventh conduit means.

20. An aircraft wheel brake controlling system according to claim 16, wherein the volumes of the first conduit means, the second stage metering valve, the second stage conduit means and the command pressure chamber of the third stage metering valve are collectively small and require very little flow through the first stage metering valve in order to produce a feedback pressure to the first stage metering valve.

21. An aircraft wheel brake controlling system according to claim 20, further including an antiskid valve in the seventh conduit means.

22. An aircraft wheel brake controlling system according to claim 16, further including an antiskid valve in the seventh conduit means.

23. An aircraft wheel brake controlling system according to claim 15, wherein the volumes of the first conduit means, the second stage metering valve, the second stage conduit means and the command pressure chamber of the third stage metering valve are collectively small and require very little flow through the first stage metering valve in order to produce a feedback pressure to the first stage metering valve.

24. An aircraft wheel brake controlling system according to claim 23, further including an antiskid valve in the seventh conduit means.

25. An aircraft wheel brake controlling system according to claim 15, further including an antiskid valve in the seventh conduit means.

26. A method of using an aircraft wheel brake controlling system of a type comprising:

a first stage metering valve including a first port control member, a pressure port, a return port and an output port;

pilot operated foot control means for moving the first port control member in a pressure port opening first direction;

a second stage metering valve having an inlet port, an outlet port and pressure control means between such ports;

first conduit means connecting the output port of the first stage metering valve to the input port of the second stage metering valve;

a third stage metering valve comprising a second port control member, a pressure port, a return port, a brake port and a command pressure chamber at one end of the second port control member;

second conduit means connecting the output port of the second stage metering valve to the command pressure chamber of the third stage metering valve;

third conduit means connecting the pressure port of the third stage metering valve to the source of supply pressure;

fourth conduit means connecting the return port of the third stage metering valve to return pressure;

fifth conduit means connecting the brake port of the third stage metering valve to an aircraft wheel brake;

wherein the first stage metering valve has an off position in which there is no foot pedal force on the first port control member and such first port control member is positioned to block the pressure port and to communicate the outlet port with the return port;

wherein a pilot foot force supplied to the foot control means depresses the first port control member so that it in turn meters flow from the pressure port to the output port in proportion to displacement of the first port control member;

wherein said third stage metering valve has an off position in which the second port control member is positioned to block the pressure port and communicate the brake port with the return port;

wherein a pilot applied foot force on the foot control means, for causing the first port control member to meter pressure through the first stage metering valve, results in the delivery of a command pressure to the command pressure chamber of the third stage metering valve, via the second stage metering valve, and this causes the second port control member to move and meter pressure and flow through such third stage metering valve in an amount proportional to the displacement of the second port control member;

wherein said third stage metering valve includes feedback means for feeding brake pressure in the fifth conduit means to the second port control member, to exert a force on such second port control member opposite to the command pressure force, for moving the second port control member into a null position in response to the pressure build-up in the brake;

said first stage metering valve including feedback means for delivering a feedback pressure signal from the first conduit means to the first port control member, for exerting a force on such first port control member opposite to the pilot applied foot force, for moving the first port control member to a null position in response to a pressure increase in said first conduit means; and wherein the pressure control means of the second stage metering valve includes an electrical control which receives a control signal from the pilot, and said second stage metering valve has an off position in which it essentially makes no change in the pressure delivered to it by the first stage metering valve so that the second stage metering valve in effect transmits the pressure output of the first stage metering valve to the command pressure chamber of the third stage metering valve, said method comprising:

maintaining the second stage metering valve in an off position, so that the pressure in the command pressure chamber of the third stage metering valve will be fed back to the first stage metering valve for exerting a force on the first port control member opposite to the pilot applied foot force, for moving the first port control member into a null position in response to a pressure increase in the command pressure chamber.

27. A method of using an aircraft wheel brake controlling system of a type comprising:

a first stage metering valve including a first port control member, a pressure port, a return port and an output port;

pilot operated foot control means for moving the first port control member in a pressure port opening first direction;

a second stage metering valve having an inlet port, an outlet port and pressure control means between such ports;

first conduit means connecting the output port of the first stage metering valve to the input port of the second stage metering valve;

a third stage metering valve comprising a second port control member, a pressure port, a return port, a brake port and a command pressure chamber at one end of the second port control member;

second conduit means connecting the output port of the second stage metering valve to the command pressure chamber of the third stage metering valve;

third conduit means connecting the pressure port of the third stage metering valve to the source of supply pressure;

fourth conduit means connecting the return port of the third stage metering valve to return pressure;

fifth conduit means connecting the brake port of the third stage metering valve to an aircraft wheel brake;

wherein the first stage metering valve has an off position in which there is no foot pedal force on the first port control member and such first port control member is positioned to block the pressure port and to communicate the outlet port with the return port;

wherein a pilot foot force supplied to the foot control means depresses the first port control member so that it in turn meters flow from the pressure port to the output port in proportion to displacement of the first port control member;

wherein said third stage metering valve has an off position in which the second port control member is positioned to block the pressure port and communicate the brake port with the return port;

wherein a pilot applied foot force on the foot control means, for causing the first port control member to meter pressure through the first stage metering valve, results in the delivery of a command pressure to the command pressure chamber of the third stage metering valve, via the second stage metering valve, and this causes the second port control member to move and meter pressure and flow through such third stage metering valve in an amount proportional to the displacement of the second port control member;

wherein said third stage metering valve includes feedback means for feeding brake pressure in the fifth conduit means to the second port control member, to exert a force on such second port control member opposite to the command pressure force, for moving the second port control member into a null position in response to the pressure build-up in the brake;

said first stage metering valve including feedback means for delivering a feedback pressure signal from the first conduit means to the first port control member, for exerting a force on such first port control member opposite to the pilot applied foot force, for moving the first port control member to a null position in response to a pressure increase in said first conduit means; and wherein the pressure control means of the second stage metering valve includes an electrical control which receives a control signal from the pilot, and said second stage metering valve has an off position in which it essentially makes no change in the pressure delivered to it by the first stage metering valve so that the second stage metering valve in effect transmits the pressure output of the first stage metering valve to the command pressure chamber of the third stage metering valve, said method comprising:

sending an electrical signal to the electrical control for the second stage metering valve, for causing the second stage metering valve to reduce the pressure received by it from the first stage metering valve, and directing such reduced pressure from the second stage metering valve into the command pressure chamber of the third stage metering valve, and using such reduced pressure for commanding movement of the port control member of the third stage metering valve.

28. A method of using an aircraft wheel brake controlling system of a type comprising:
 a first stage metering valve including a first port control member, a pressure port, a return port and an output port;
 pilot operated foot control means for moving the first port control member in a pressure port opening first direction;
 a second stage metering valve having an inlet port, an outlet port and pressure control means between such ports;
 first conduit means connecting the output port of the first stage metering valve to the input port of the second stage metering valve;
 a third stage metering valve comprising a second port control member, a pressure port, a return port, a brake port and a command pressure chamber at one end of the second port control member;
 second conduit means connecting the output port of the second stage metering valve to the command pressure chamber of the third stage metering valve;
 third conduit means connecting the pressure port of the third stage metering valve to the source of supply pressure;
 fourth conduit means connecting the return port of the third stage metering valve to return pressure;
 fifth conduit means connecting the brake port of the third stage metering valve to an aircraft wheel brake;
 wherein the first stage metering valve has an off position in which there is no foot pedal force on the first port control member and such first port control member is positioned to block the pressure port and to communicate the output port with the return port;
 wherein a pilot foot force supplied to the foot control means depresses the first port control member so that it in turn meters flow from the pressure port to the output port in proportion to displacement of the first port control member;
 wherein said third stage metering valve has an off position in which the second port control member is positioned to block the pressure port and communicate the brake port with the return port;
 wherein a pilot applied foot force on the foot control means, for causing the first port control member to meter pressure through the first stage metering valve, results in the delivery of a command pressure to the command pressure chamber of the third stage metering valve, via the second stage metering valve, and this causes the second port control member to move and meter pressure and flow through such third stage metering valve in an amount proportional to the displacement of the second port control member;
 wherein said third stage metering valve includes feedback means for feeding brake pressure in the fifth conduit means to the second port control member, to exert a force on such second port control member opposite to the command pressure force, for moving the second port control member into a null position in response to the pressure build-up in the brake;
 said first stage metering valve including feedback means for delivering a feedback pressure signal from the first conduit means to the first port control member, for exerting a force on such first port control member opposite to the pilot applied foot force, for moving the first port control member to a null position in response to a pressure increase in said first conduit means; and
 wherein the pressure control means of the second stage metering valve includes an electrical control which receives a control signal from the pilot, and said second stage metering valve has an off position in which it essentially makes no change in the pressure delivered to it by the first stage metering valve so that the second stage metering valve in effect transmits the pressure output of the first stage metering valve to the command pressure chamber of the third stage metering valve, said method comprising:
 sending an electrical signal to the electrical control for the second stage metering valve during aircraft taxiing, for causing the second stage metering valve to reduce the pressure received by it from the first stage metering valve, and directing such reduced pressure from the second stage metering valve into the command pressure chamber of the third stage metering valve, and using such reduced pressure for commanding movement of the port control member of the third stage metering valve, while applying the brakes during taxiing.

29. A method for using an aircraft wheel brake controlling system of a type comprising:
 an aircraft wheel brake including fluid operated brake applying means;
 a first stage metering valve comprising:
 housing means defining a first axial chamber having a closed end, an end opening, a pressure port, a return port and an output port,
 a first port control member within said chamber, including a control portion which projects outwardly from said chamber through said end opening,
 said first port control member being movable axially within said chamber between an extended position and a depressed position,
 said first port control member functioning to block the pressure port and connecting the output port when the first port control member is extended,
 said first port control member functioning to block the return port and connecting the pressure port to the output port when the first port control member is depressed, and
 said first port control member functioning to meter flow from the pressure port to the output port in proportion to displacement of the first port control member between its extended and depressed positions;
 pilot operable control means in contact with the control portion of said first port control member, for depressing the first port control member by foot pressure;
 a second stage metering valve comprising an inlet port, an outlet port, and electrically controlled means between the two ports for reducing the pressure of the fluid between the inlet and outlet ports at a rate proportional to a control current input;
 a third stage metering valve comprising:

housing means defining a second axial chamber having first and second closed ends, a pressure port, a return port and a brake port;
a second port control member in said second axial chamber, movable axially within said second axial chamber between first and second positions:
said second port control member functioning to block the pressure port and connecting the brake port to the return port when the second port control member is in its first position,
said second port control member functioning to block the return port and connecting the pressure port to the brake port when the said second port control member is in its second position, and
said second port control member functioning to meter flow from the pressure port to the brake port in proportion to displacement of the second port control member between its first and second positions;
first conduit means connecting the pressure port of the first stage metering valve to a supply pressure;
second conduit means connecting the return port of the first stage metering valve to return pressure;
third conduit means connecting the output port of the first stage metering valve to the inlet port of the second stage metering valve;
fourth conduit means connecting the outlet port of the second stage metering valve to the first end of the second axial chamber located in the third stage metering valve;
fifth conduit means connecting the pressure port of the third stage metering valve to a source of supply pressure;
sixth conduit means connecting the return port of the third stage metering valve to return pressure;
seventh conduit means connecting the brake port of the third stage metering valve to the fluid operated brake applying means of the aircraft wheel brake; and
wherein the pressure control means of the second stage metering valve includes an electrical control which receives a control signal from the pilot, and said second stage metering valve has an off position in which it essentially makes no change in the pressure delivered to it by the first stage metering valve so that the second stage metering valve in effect transmits the pressure output of the first stage metering valve to the command pressure chamber of the third stage metering valve, said method comprising:
maintaining the second stage metering valve in an off position, so that the pressure in the command pressure chamber of the third stage metering valve will be fed back to the first stage metering valve for exerting a force on the first port control member opposite to the pilot applied foot force, for moving the first port control member into a null position in response to a pressure increase in the command pressure chamber.

30. A method of an aircraft wheel brake controlling system of a type comprising:
an aircraft wheel brake including fluid operated brake applying means;
a first stage metering valve comprising:
housing means defining a first axial chamber having a closed end, an end opening, a pressure port, a return port and an output port,
a first port control member within said chamber, including a control portion which projects outwardly from said chamber through said end opening,
said first port control member being movable axially within said chamber between an extended position and a depressed position,
said first port control member functioning to block the pressure port and connecting the output port when the first port control member is extended,
said first port control member functioning to block the return port and connecting the pressure port to the output port when the first port control member is depressed, and
said first port control member functioning to meter flow form the pressure port to the output port in proportion to displacement of the first port control member between its extended and depressed positions;
pilot operable control means in contact with the control portion of said first port control member, for depressing the first port control member by foot pressure;
a second stage metering valve comprising an inlet port, an outlet port, and electrically controlled means between the two ports for reducing the pressure of the fluid between the inlet and outlet ports at a rate proportional to a control current input;
a third stage metering valve comprising:
housing means defining a second axial chamber having first and second closed ends, a pressure port, a return port and a brake port;
a second port control member in said second axial chamber, movable axially within said second axial chamber between first and second positions:
said second port control member functioning to block the pressure port and connecting the brake port to the return port when the second port control member is in its first position,
said second port control member functioning to block the return port and connecting the pressure port to the brake port when the said second port control member is in its second position, and
said second port control member functioning to meter flow from the pressure port to the brake port in proportion to displacement of the second port control member between its first and second positions;
first conduit means connecting the pressure port of the first stage metering valve to a supply pressure;
second conduit means connecting the return port of the first stage metering valve to return pressure;
third conduit means connecting the output port of the first stage metering valve to the inlet port of the second stage metering valve;
fourth conduit means connecting the outlet port of the second stage metering valve to the first end of the second axial chamber located in the third stage metering valve;
fifth conduit means connecting the pressure port of the third stage metering valve to a source of supply pressure;
sixth conduit means connecting the return port of the third stage metering valve to return pressure;
seventh conduit means connecting the brake port of the third stage metering valve to the fluid operated brake applying means of the aircraft wheel brake; and wherein the pressure control means of the second stage metering valve includes an electrical control which receives a control signal from the pilot, and said second stage metering valve has an off position in which it essentially makes no change in the pressure delivered to it by the first stage metering valve so that the second stage metering valve in effect transmits the pressure output of the first stage metering valve to the command pressure chamber of the third stage metering valve, said method comprising:

sending an electrical signal to the electrical control for the second stage metering valve, for causing the second stage metering valve to reduce the pressure received by it from the first stage metering valve, and directing such reduced pressure from the second stage metering value into the command pressure chamber of the third stage metering valve, and using such reduced pressure for commanding movement of the port control member of the third stage metering valve.

31. A method of using an aircraft wheel brake controlling system of a type comprising:

an aircraft wheel brake including fluid operated brake applying means;

a first stage metering valve comprising:

housing means defining a first axial chamber having a closed end, an end opening, a pressure port, a return port and an output port, a first port control member within said chamber, including a control portion which projects outwardly from said chamber through said end opening, said first port control member being movable axially within said chamber between an extended position and a depressed position, said first port control member functioning to block the pressure port and connecting the output port when the first port control member is extended, said first port control member functioning to block the return port and connecting the pressure port to the output port when the first port control member is depressed, and said first port control member functioning to meter flow from the pressure port to the output port in proportion to displacement of the first port control member between its extended and depressed positions;

pilot operable control means in contact with the control portion of said first port control member, for depressing the first port control member by foot pressure;

a second stage metering valve comprising an inlet port, an outlet port, and electrically controlled means between the two ports for reducing the pressure of the fluid between the inlet and outlet ports at a rate proportional to a control current input;

a third stage metering valve comprising:

housing means defining a second axial chamber having first and second closed ends, a pressure port, a return port and a brake port;

a second port control member in said second axial chamber, movable axially within said second axial chamber between first and second positions:

said second port control member functioning to block the pressure port and connecting the brake port to the return port when the second port control member is in its first position, said second port control member functioning to block the return port and connecting the pressure port to the brake port when the said second port control member is in its second position, and said second port control member functioning to meter flow from the pressure port to the brake port in proportion to displacement of the second port control member between its first and second positions;

first circuit means connecting the pressure port of the first stage metering valve to a supply pressure;

said conduit means connecting the return port of the first stage metering valve to return pressure;

third conduit means connecting the output port of the first stage metering valve to the inlet port of the second stage metering valve;

fourth conduit means connecting the outlet port of the second stage metering valve to the first end of the second axial chamber located in the third stage metering valve;

fifth conduit means connecting the pressure port of the third stage metering valve to a source of supply pressure;

sixth conduit means connecting the return port of the third stage metering valve to return pressure;

seventh conduit means connecting the brake port of the third stage metering valve to the fluid operated brake applying means of the aircraft wheel brake; and wherein the pressure control means of the second stage metering valve includes an electrical control which receives a control signal from the pilot, and said second stage metering valve has an off position in which it essentially makes no change in the pressure delivered to the by the first stage metering valve so that the second stage metering valve in effect transmits the pressure output of the first stage metering valve to the command pressure chamber of the third stage metering valve, said method comprising:

sending an electrical signal to the electrical control for the second stage metering valve during aircraft taxiing, for causing the second stage metering valve to reduce the pressure received by it from the first stage metering valve, and directing such reduced pressure from the second stage metering valve into the command pressure chamber of the third stage metering valve, and using such reduced pressure for commanding movement of the port control member of the third stage metering valve, while applying the brakes during taxiing.

* * * * *